(12) United States Patent
Fowe et al.

(10) Patent No.: US 11,443,341 B2
(45) Date of Patent: Sep. 13, 2022

(54) METHOD, APPARATUS, AND COMPUTER PROGRAM PRODUCT FOR ORGANIZING PEDESTRIAN MOVEMENT

(71) Applicant: HERE Global B.V., Eindhoven (NL)

(72) Inventors: James Fowe, Chicago, IL (US); Timothy Garcia, Westport, CT (US); Naoko Harada, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/692,772

(22) Filed: Nov. 22, 2019

(65) Prior Publication Data

US 2021/0158394 A1 May 27, 2021

(51) Int. Cl.
*G06Q 30/02* (2012.01)
*H04W 4/02* (2018.01)

(52) U.S. Cl.
CPC ..... *G06Q 30/0251* (2013.01); *G06Q 30/0261* (2013.01); *H04W 4/02* (2013.01)

(58) Field of Classification Search
CPC ...... G06Q 30/02; G06Q 30/0251; H04W 4/02
See application file for complete search history.

(56) References Cited

U.S. PATENT DOCUMENTS

| | | | |
|---|---|---|---|
| 7,092,964 B1 * | 8/2006 | Dougherty | G06Q 30/02 707/999.003 |
| 8,073,460 B1 | 12/2011 | Scofield et al. | |
| 8,560,361 B2 | 10/2013 | Shang et al. | |
| 8,712,857 B1 * | 4/2014 | Adornato | G06Q 30/0207 705/26.7 |
| 9,207,089 B2 | 12/2015 | Friedlander et al. | |
| 9,792,813 B2 | 10/2017 | Colonna | |
| 2004/0076279 A1 * | 4/2004 | Taschereau | G06Q 30/0251 379/218.01 |

(Continued)

FOREIGN PATENT DOCUMENTS

| | | | | |
|---|---|---|---|---|
| CA | 2533571 A1 * | 8/2006 | | G06F 16/29 |
| JP | 2013167454 A * | 8/2013 | | |

OTHER PUBLICATIONS

Chan, K. S. et al., *Simultaneous Estimation of the Pedestrian Origin-Destination Matrix and Parameter of the Activity/Destination Choice Model*, Proceedings of the Eastern Asia Society for Transportation Studies, vol. 6 (20907) 14 pages.

(Continued)

*Primary Examiner* — Vincent M Cao
(74) *Attorney, Agent, or Firm* — Alston & Bird LLP (57) ABSTRACT

A method, apparatus, and computer program product are provided for organizing pedestrian movement data. The method includes receiving a set of travel data. The set of travel data includes one or more pedestrian trips including an origin and a destination. The method also includes generating a pedestrian flow matrix. The pedestrian flow matrix has one or more pedestrian flow compartments. The method further includes assigning at least one of the pedestrian trips to one or more of the pedestrian flow compartments based on the origin and the destination of the given pedestrian trip. Corresponding apparatuses and computer program products are also provided.

20 Claims, 4 Drawing Sheets

(56) References Cited

U.S. PATENT DOCUMENTS

| | | | |
|---|---|---|---|
| 2007/0129880 A1* | 6/2007 | Thacher | H04W 4/027 |
| | | | 701/533 |
| 2009/0030778 A1* | 1/2009 | Zapata | G06F 21/6254 |
| | | | 705/7.34 |
| 2009/0157302 A1* | 6/2009 | Tashev | G06Q 30/0273 |
| | | | 701/467 |
| 2010/0002908 A1 | 1/2010 | Miyamoto et al. | |
| 2012/0197690 A1* | 8/2012 | Agulnek | G01C 21/3697 |
| | | | 705/14.1 |
| 2014/0257949 A1* | 9/2014 | Gishen | G06Q 30/0252 |
| | | | 705/14.5 |
| 2014/0279012 A1 | 9/2014 | Scofield et al. | |
| 2015/0073687 A1 | 3/2015 | Hampapur et al. | |
| 2015/0292894 A1* | 10/2015 | Goddard | G01C 21/3453 |
| | | | 701/400 |
| 2016/0300485 A1 | 10/2016 | Ayvaci et al. | |
| 2018/0233032 A1 | 8/2018 | Colonna et al. | |

OTHER PUBLICATIONS

Pedestrian Flow | intranet.here.com [online] [retrieved Feb. 4, 2020]. https://intranet.here.com/pedstrian-flow (2020) 6 pages.

Extended European Search Report for European Application No. 20209273.0 dated Apr. 20, 2021, 8 pages.

* cited by examiner

METHOD, APPARATUS, AND COMPUTER PROGRAM PRODUCT FOR ORGANIZING PEDESTRIAN MOVEMENT

TECHNOLOGICAL FIELD

An example embodiment relates generally to using pedestrian movement for advertising and, more particularly, to using pedestrian movement for spaciotemporal use, such as advertising.

BACKGROUND

Understanding pedestrian movement patterns can be helpful for a variety of use cases, including advertising technology (adtech), consumer and retail technologies, financial predictions, smart cities, and the like. However, pedestrian-specific movement data is often difficult to determine and require complete data models that require heavy computing in order to get useful information. Based on this, pedestrian-specific movement data is not widely available and therefore use cases, such as adtech, are not able to be optimized.

BRIEF SUMMARY

A method, apparatus, and computer program product are provided in accordance with an example embodiment in order to organize pedestrian movement data. In an example embodiment, the method includes receiving a set of travel data. The set of travel data includes one or more pedestrian trips including an origin and a destination. The method also includes generating a pedestrian flow matrix. The pedestrian flow matrix has one or more pedestrian flow compartments. The method further includes assigning at least one of the pedestrian trips to one or more of the pedestrian flow compartments based on the origin and the destination of the given pedestrian trip.

In some embodiments, the method also includes determining an advertisement to provide to a user based on the pedestrian flow matrix. In some embodiments, the one or more pedestrian flow compartments are divided based on at least one of zip code level, link level, or point of interest level. In some embodiments, the one or more pedestrian trips includes temporal information including a time at original and/or a time at destination.

In some embodiments, a plurality of pedestrian flow matrices are each generated with a plurality of time ranges. In some embodiments, the set of travel data further includes one or more sub-location points. In such an embodiment, the sublocation points are intermediate locations between the origin and the destination. In some embodiments, at least one sublocation point is used as an origin or destination in determining the assignment of the pedestrian tip to the pedestrian flow compartment.

In another example embodiment, an apparatus is provided for organizing pedestrian movement data. The apparatus includes at least one processor and at least one non-transitory memory including computer program code instructions, the computer program code instructions configured to, when executed, cause the apparatus to receive a set of travel data. The set of travel data includes one or more pedestrian trips including an origin and a destination. The computer program instructions are also configured to, when executed, cause the apparatus to generate a pedestrian flow matrix. The pedestrian flow matrix has one or more pedestrian flow compartments. The computer program instructions are further configured to, when executed, cause the apparatus to assign at least one of the pedestrian trips to one or more of the pedestrian flow compartments.

In some embodiments, the computer program code instructions are further configured to, when executed, cause the apparatus to determine an advertisement to provide to a user based on the pedestrian flow matrix. In some embodiments, the one or more pedestrian flow compartments are divided based on at least one of zip code level, link level, or point of interest level. In some embodiments, the one or more pedestrian trips includes temporal information including a time at original and/or a time at destination. In some embodiments, a plurality of pedestrian flow matrices are each generated with a plurality of time ranges.

In some embodiments, the set of travel data further includes one or more sub-location points. In such embodiments, sublocation points are intermediate locations between the origin and the destination. In some embodiments, at least one sublocation point is used as an origin or destination in determining the assignment of the pedestrian tip to the pedestrian flow compartment.

In yet another example embodiment, a computer program product is provided that includes at least one non-transitory computer-readable storage medium having computer-executable program code portions stored therein with the computer-executable program code portions including program code instructions configured to receive a set of travel data. The set of travel data includes one or more pedestrian trips including an origin and a destination. The computer-executable program code portions also include program code instructions configured to generate a pedestrian flow matrix. The pedestrian flow matrix has one or more pedestrian flow compartments. The computer-executable program code portions further include program code instructions configured to assign at least one of the pedestrian trips to one or more of the pedestrian flow compartments based on the origin and the destination of the given pedestrian trip.

In some embodiments, the program code instructions are further configured to determine an advertisement to provide to a user based on the pedestrian flow matrix. In some embodiments, the one or more pedestrian flow compartments are divided based on at least one of zip code level, link level, or point of interest level. In some embodiments, the one or more pedestrian trips includes temporal information including a time at original and/or a time at destination. In some embodiments, a plurality of pedestrian flow matrices are each generated with a plurality of time ranges. In some embodiments, the set of travel data further includes one or more sub-location points, wherein the sublocation points are intermediate locations between the origin and the destination and at least one sublocation point is used as an origin or destination in determining the assignment of the pedestrian tip to the pedestrian flow compartment.

In still another example embodiment, an apparatus is provided including means for receiving a set of travel data. The set of travel data includes one or more pedestrian trips including an origin and a destination. The apparatus also includes means for generating a pedestrian flow matrix. The pedestrian flow matrix has one or more pedestrian flow compartments. The apparatus further includes means for assigning at least one of the pedestrian trips to one or more of the pedestrian flow compartments based on the origin and the destination of the given pedestrian trip.

In some embodiments, the apparatus also includes means for determining an advertisement to provide to a user based on the pedestrian flow matrix. In some embodiments, the one or more pedestrian flow compartments are divided based on at least one of zip code level, link level, or point of interest level. In some embodiments, the one or more pedestrian trips includes temporal information including a time at original and/or a time at destination.

In some embodiments, a plurality of pedestrian flow matrices are each generated with a plurality of time ranges. In some embodiments, the set of travel data further includes one or more sub-location points. In such an embodiment, the sublocation points are intermediate locations between the origin and the destination. In some embodiments, at least one sublocation point is used as an origin or destination in determining the assignment of the pedestrian tip to the pedestrian flow compartment.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. The term advertisement may be used to mean any information that may be provided to a pedestrian. Thus, use of any such terms should not be taken to limit the spirit and scope of embodiments of the present invention.

Various embodiments of the present disclosure allow for pedestrian travel patterns to be monitored and subsequently predicted, such that the travel patterns may be used in conjunction with advertising technology, marketing technology, city planning and smart cities, mobility solutions, real estate, financial technology, and/or the like. Various embodiments of the present disclosure allow for effective processing of source data in such a way that the data may be used to produce travel patterns for pedestrians, which is currently difficult to find and/or determine on a large scale. In various embodiments, the travel data may be captured through raw GPS data, Wi-Fi communication (e.g., with mobile devices), beacons, and/or other types of positioning probe devices. The present disclosure may use travel data (e.g., probe data) to identify an origin and a destination of a pedestrian trip, and subsequently process the travel data to allow for spaciotemporal analysis.

Figure 1:
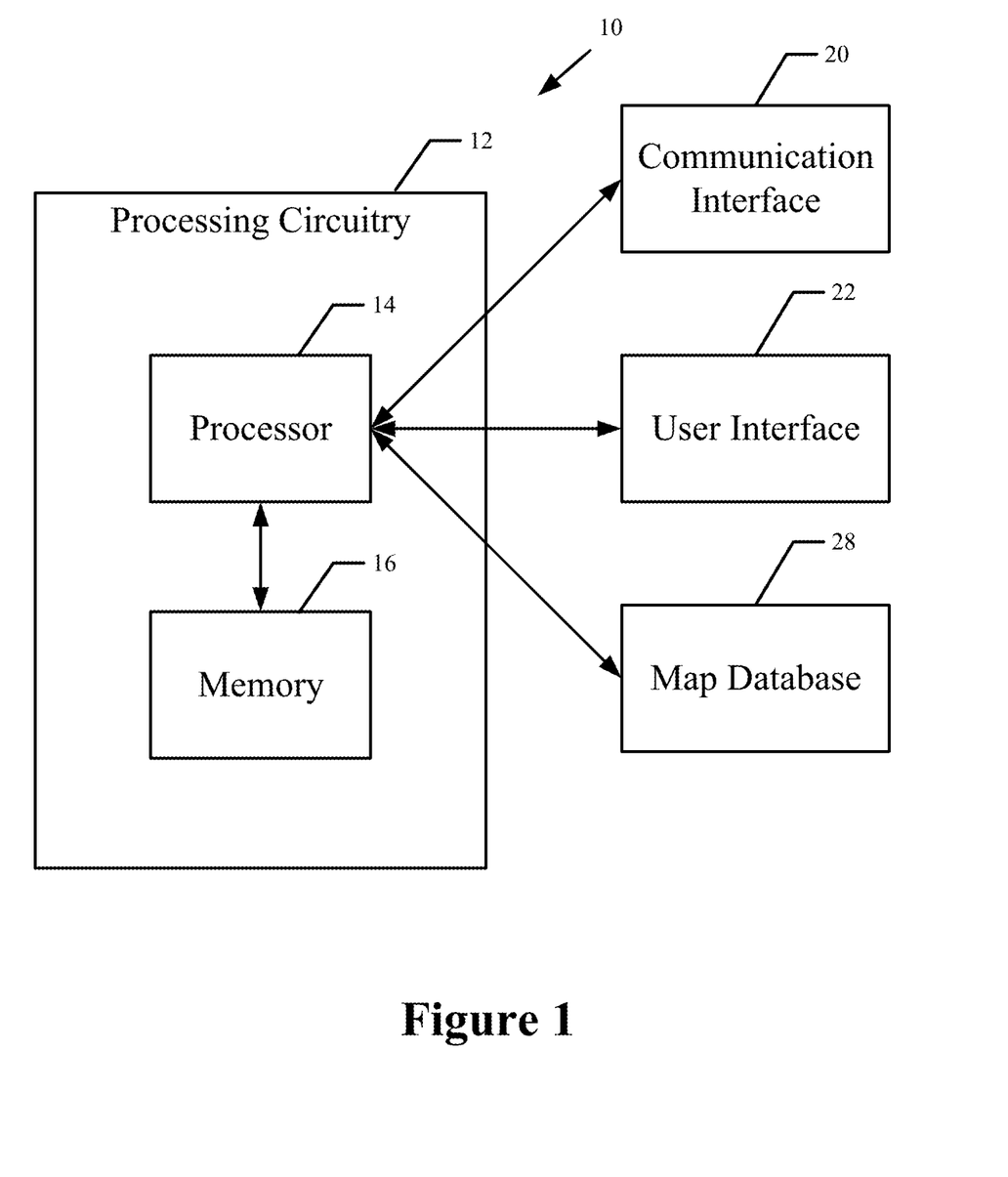
FIG. 1 is a block diagram of an apparatus that may be specifically configured in accordance with an example embodiment of the present disclosure.

FIG. 1 is a schematic diagram of an example apparatus 10 configured for performing any of the operations in accordance with an example embodiment as described herein. Apparatus 10 may be embodied by or associated with any of a variety of computing devices that include or are otherwise associated with a device configured for providing mobile advertisements to pedestrians. In other embodiments of the apparatus, the apparatus itself may be embodied or partially embodied as a mobile terminal, such as a personal digital assistant (PDA), mobile telephone, smart phone, personal navigation device, smart watch, tablet computer, camera or any combination of the aforementioned.

Optionally, the apparatus 10 may be embodied by or associated with a plurality of computing devices that are in communication with or otherwise networked with one another such that the various functions performed by the apparatus may be divided between the plurality of computing devices that operate in collaboration with one another.

The apparatus 10 may include, be associated with, or may otherwise be in communication with a processing circuitry 12, which includes a processor 14 and a memory device 16, a communication interface 20, and a user interface 22. In some embodiments, the processor 14 (and/or co-processors or any other processing circuitry assisting or otherwise associated with the processor) may be in communication with the memory device 16 via a bus for passing information among components of the apparatus. The memory device 16 may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device like the processor). The memory device 16 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 14 may be embodied in a number of different ways. For example, the processor 14 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor 14 may be configured to execute hard coded functionality. As such, whether configured by hardware or software methods, or by a combination thereof, the processor 14 may represent an entity (for example, physically embodied in circuitry) capable of performing operations according to an embodiment of the present disclosure while configured accordingly. Thus, for example, when the processor 14 is embodied as an ASIC, FPGA or the like, the processor may be specifically configured hardware for conducting the operations described herein. Alternatively, as another example, when the processor 14 is embodied as an executor of software instructions, the instructions may specifically configure the processor to perform the algorithms and/or operations described herein when the instructions are executed. However, in some cases, the processor 14 may be a processor of a specific device (for example, the computing device) configured to employ an embodiment of the present invention by further configuration of the processor by instructions for performing the algorithms and/or operations described herein. The processor 14 may include, among other things, a clock, an arithmetic logic unit (ALU) and logic gates configured to support operation of the processor.

The apparatus 10 of an example embodiment may also include or otherwise be in communication with a user interface 22. The user interface 22 may include a touch screen display, a speaker, physical buttons, and/or other input/output mechanisms. In an example embodiment, the processor 14 may comprise user interface circuitry configured to control at least some functions of one or more input/output mechanisms. The processor 14 and/or user interface 22 comprising the processor may be configured to control one or more functions of one or more input/output mechanisms through computer program instructions (for example, software and/or firmware) stored on a memory accessible to the processor (for example, memory device 16, and/or the like). The user interface 22 may be embodied in the same housing as the processing circuitry. Alternatively, the user interface 22 may be separate from the processor circuitry 12.

The apparatus 10 of an example embodiment may also optionally include a communication interface 20 that may be any means such as a device or circuitry embodied in either hardware or a combination of hardware and software that is configured to receive and/or transmit data from/to other electronic devices in communication with the apparatus, such as by near field communication (NFC) or other proximity-based techniques, such as Bluetooth. Additionally or alternatively, the communication interface 20 may be configured to communicate via cellular or other wireless protocols including Global System for Mobile Communications (GSM), such as but not limited to 4G, 5G, and Long Term Evolution (LTE). In this regard, the communication interface 20 may include, for example, an antenna (or multiple antennas) and supporting hardware and/or software for enabling communications with a wireless communication network. Additionally or alternatively, the communication interface 20 may include the circuitry for interacting with the antenna(s) to cause transmission of signals via the antenna(s) or to handle receipt of signals received via the antenna(s). In some environments, the communication interface 20 may alternatively or also support wired or wireless communications.

The apparatus 10 may have a mapping or navigation interface so as to use maps in order to carry out the operations discussed herein. In order to support a mapping application, the computing device may include or otherwise be in communication with a geographic map database 28, such as may be stored in memory 16 or is otherwise accessible to the processor, such as in map database 28. For example, the geographic map database 28 includes node data records, sidewalk segment or link data records, point of interest (POI) data records, and other data records. More, fewer, or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or Global Positioning System (GPS) data associations (such as using known or future map matching or geo-coding techniques), for example. Some map data for sidewalks may be derived from road data corresponding to nearby road segments. For example, busy roads in some areas may have higher pedestrian traffic than less busy roads. Furthermore, other positioning technology may be used, such as electronic horizon sensors, radar, Light Detection and Ranging (LiDAR), ultrasonic and/or infrared sensors.

The map database 28 may include node data, path segment data, point of interest (POI) data, or the like. The map database may also include cartographic data, routing data, and/or maneuvering data. According to some example embodiments, the path segment and node data records or other data that may represent pedestrian paths or areas. The node data may be end points corresponding to the respective links or segments of path segment data. The path data and the node data may represent a path network, such as used by pedestrians, bicycles, mobile robots, and/or other entities. Optionally, the map database may contain road segment data records may be links or segments representing roads, streets, or paths, as may be used in calculating a route or recorded route information for determination of one or more personalized routes in addition to or instead of the pedestrian walkway record data, for example. The road link data and the node data may represent a road network, such as used by vehicles, cars, trucks, buses, motorcycles, and/or other entities. The path segments and nodes data, as well as the road/link segments and nodes data, can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) also known as a context associated with the POI data records or other records of the map database.

The map database 28 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to mobile navigation, pedestrian navigation, or other types of navigation. While example embodiments described herein generally relate to pedestrian travel along walkways, example embodiments may be implemented for vehicle travel along roads, bicycle travel along bike paths, boat travel along maritime navigational routes, etc.

As mentioned above, the map database 28 may be a master geographic database stored or accessible on the server side. However, in alternate embodiments, a client-side map database may represent a compiled navigation database that may be used for navigation purposes.

Figure 3A:
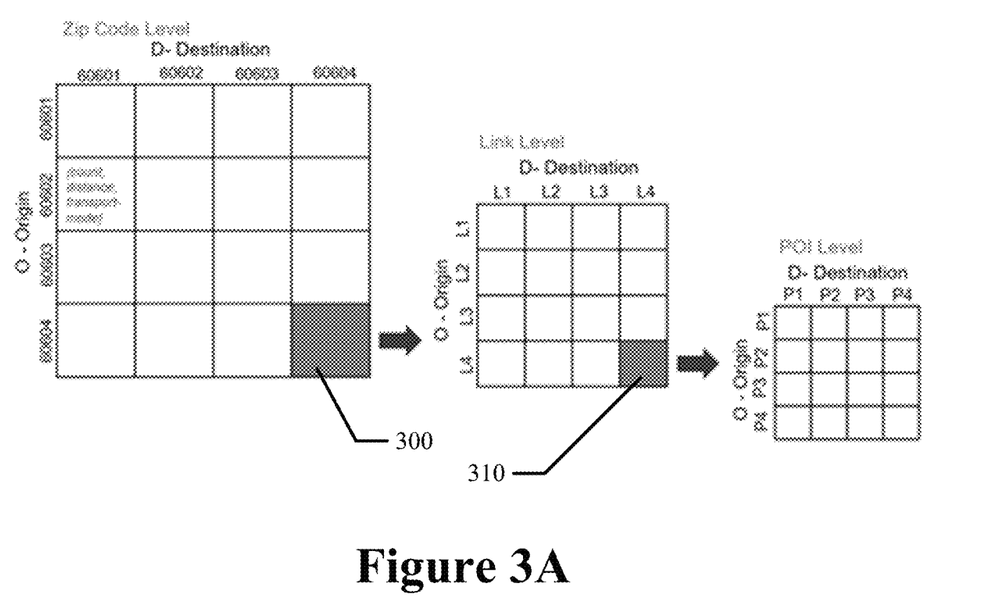
FIGS. 3A-3B are example pedestrian flow matrices with different spaciotemporal dimensions in accordance with an example embodiment of the present disclosure.
Figure 3B:
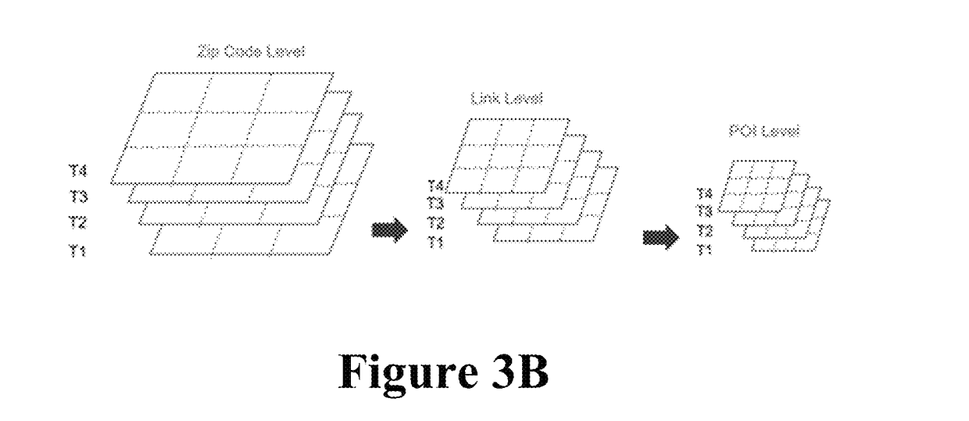

Referring now to FIG. 3, the operations performed by the apparatus 10 of an example embodiment of the present disclosure includes means, such as the processing circuitry 12, the processor 14, or the like, for organizing pedestrian data for advertising. While throughout the application the apparatus is described for use with advertising, various embodiments of the apparatus 10 may be used in other use cases, such as marketing technology, city planning and smart cities, mobility solutions, real estate, financial technology, and/or the like. As an initial matter, while advertisements are described by way of example use case for various embodiments of the present disclosure, other use cases may also be employed using the features of embodiments discussed herein.

Figure 2:
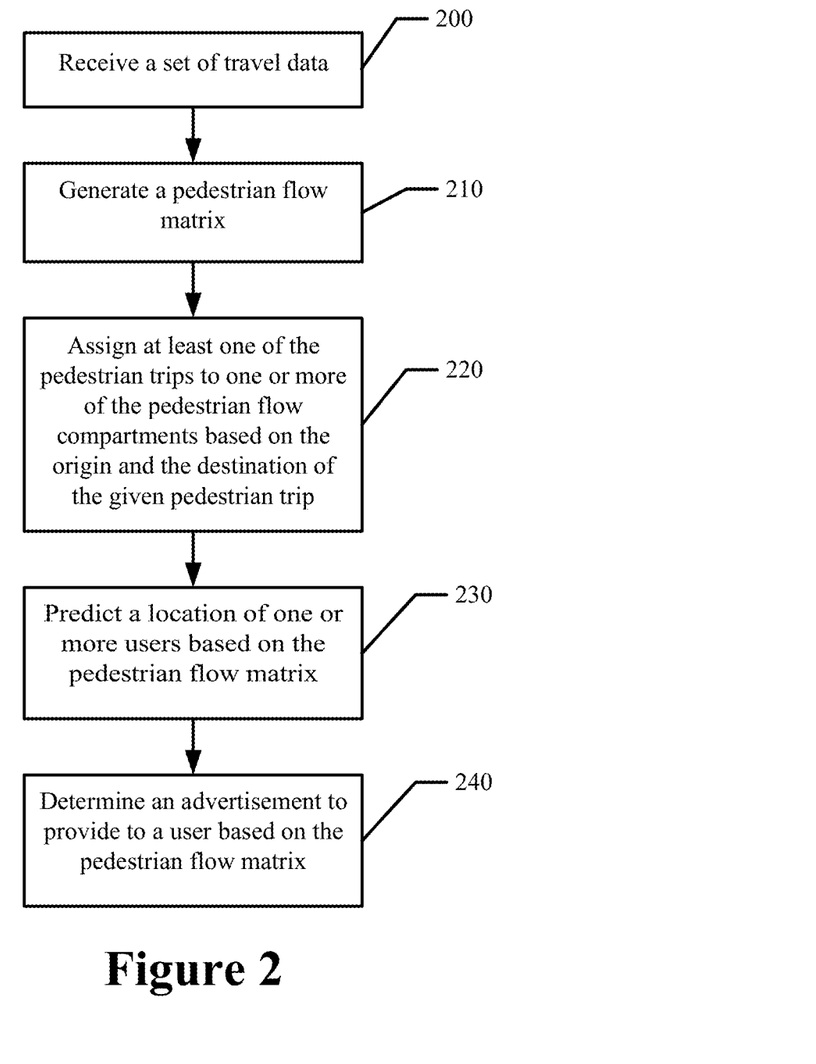
FIG. 2 is a flowchart of the operations performed, such as by the apparatus of FIG. 1, for organizing pedestrian data for an advertising use case in accordance with an example embodiment of the present disclosure.

Referring to Block 200 of FIG. 2, the apparatus 10 includes means, such as the processing circuitry 12, the processor 14, or the like, for receiving a set of travel data. In various embodiments, the set of travel data includes one or more pedestrian trips comprising an origin and a destination. In some embodiments, the travel data may include spatiotemporal information. For example, the travel data may include the time and location (e.g., derived from GPS data) for the origin of a pedestrian trip, the destination of a pedestrian trip, and/or a sublocation point of a pedestrian trip between the origin and the destination. In some embodiments, the apparatus 10 may include means, such as the communication interface 20 or the like, for receiving the travel data from one or more third party source data provider. For example, smart cities may be configured to collect data relating to pedestrian movement. In some embodiments, travel data may be received from mobile devices, public transportation trackers, ride-sharing trackers, street cameras, satellite images, or the like. In various embodiments, the travel data may include at least one of a historical pedestrian flow or a real-time pedestrian flow. For example, travel data including real-time pedestrian flow may be used in order to create real-time pedestrian flow. In some embodiments, the travel data may include information relating to the origin and destination for one or more trips at a given time. The travel data may be for any captured human movement in a given area and, as discussed below, may include both pedestrian and non-pedestrian information. In some embodiments, the apparatus 10 includes means, such as the processing circuitry 12, for prescreening the travel data to remove any non-pedestrian information (e.g., a trip by a user may be too short for a given distance to be on foot).

Figure 4:
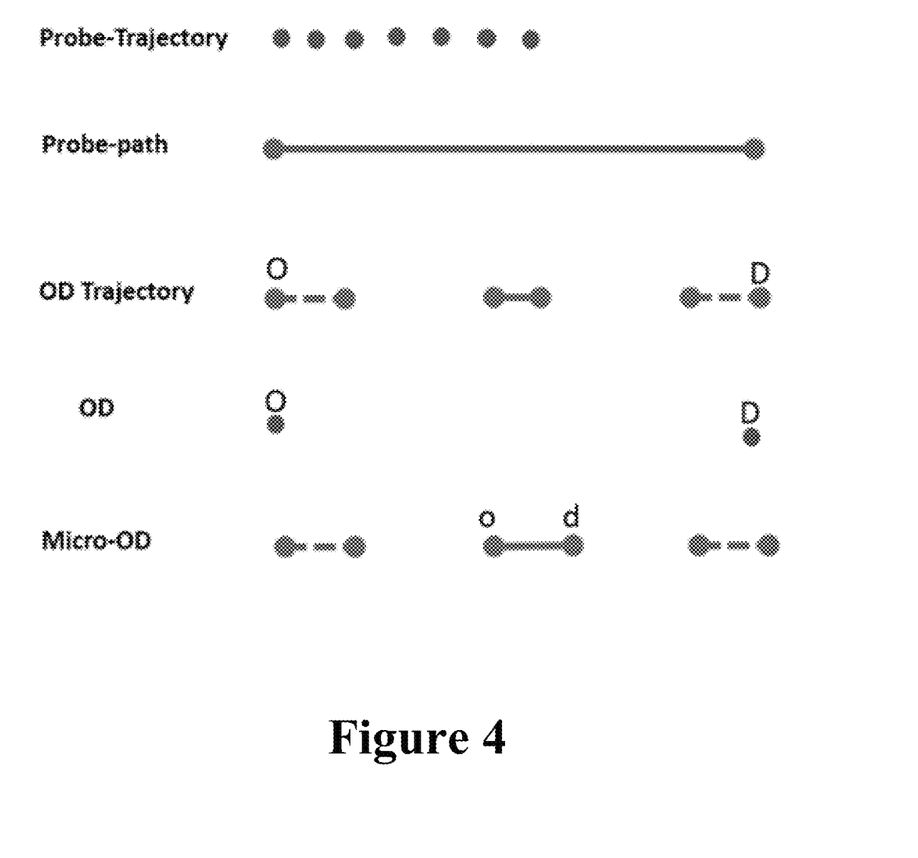
FIG. 4 illustrate example travel data received by an apparatus, such as the apparatus of FIG. 1, to be used in operations discussed herein in accordance with example embodiments of the present disclosure.

As shown in FIG. 4, the travel data may be received in various forms. For example, the travel data may be derived from raw GPS probes and be in the form of at least one of probe-trajectory, probe-path, origin-destination (OD) trajectory, OD, and micro-OD. As shown in FIG. 4, the probe-trajectory may be a plurality of probe points, that when put together illustrate a path. In an example embodiment, the apparatus 10 includes means, such as the processing circuitry 12, for determining an origin and a destination of the probe-trajectory. For example, the origin may be the first probe point along a probe-trajectory and the destination may be the last point. In various embodiments, sublocation points may also be defined along the probe-trajectory. In some embodiments, the probe-path may include both an origin and destination, along with the route from the origin to the destination. In various embodiments, one or more sublocation points may be determined along the probe-path. In some embodiments, the OD trajectory may include an origin, a destination, and at least one sublocation point between the origin and the destination. In some embodiments, the OD may be defined as the origin point and the destination point without any additional probe points. In some embodiments, the micro-OD may be defined in an instance two sublocation points between an origin and a destination are treated as an origin and destination of a smaller trip within the trip. For example, in an instance a trip includes both walking and non-walking transportation, the micro OD may allow for the apparatus 10 to pinpoint the walking portion of the trip. In some embodiments, the travel data may be used in conjunction with a digital map of walkways in various embodiments discussed herein. In various embodiment the digital map of walkways may include size, location, uniqueness, and other factors of the walkway. For example, the size of the walkways may provide an indication of the amount of people in a given area (e.g., wide squares may attract more people).

Referring now to Block 210 of FIG. 2, the apparatus includes means, such as the processing circuitry 12, the processor 14, or the like, for generating a pedestrian flow matrix. In some embodiments, the pedestrian flow matrix may define one or more pedestrian flow compartments. In various embodiments, a pedestrian flow matrix may include probe count (e.g., the amount of people moving from one area to another), frequency (e.g., the amount of time a specific identifier for a person is seen), distance (e.g., from origin to destination, may be displacement distance, journey distance, and/or travel-time), and the mode of transportation (e.g., pedestrians or otherwise). In various embodiments, the apparatus 10 includes means, such as the processing circuitry 12, the processor 14, or the like, for generating a plurality of pedestrian flow matrices. In some embodiments, the pedestrian flow matrices are configured with one or more pedestrian flow compartments defined by location. In some embodiments, the pedestrian flow compartments may be divided based on at least one of zip code level, link level, or point of interest level. In various embodiments, the division size of the compartments (e.g., zip code level, link level, or point of interest level) may vary based on the use case (e.g., may vary depending on the city being implemented). In an example embodiment, as shown in FIG. 3A, a pedestrian flow compartment may be defined with the origin location and destination location of a trip. For example, for a zip code level compartment of FIG. 3A, there are four compartments for each origin zip code based on the destination zip code (e.g., there is a compartment for starting in zip code 60601 and ending zip code 60602). In various embodiments, a pedestrian flow compartment may be further divided. For example, as shown in FIG. 3A, shaded compartment 300 of the zip code level matrix may be divided into the link level matrix, and subsequently shaded compartment 310 of the link level matrix may be divided into a POI level matrix. In some embodiments, the zip-code level may be larger than the link level, and the link level may be larger than the POI level. For example, the zip-code may be an area in a city (e.g., defined by zip codes or otherwise within a city), the link-level may be a linear stretch of a road segment within the area of the city, and the POI level may be a specific point on the road segment (e.g., the location of a retail store). In various embodiments, a given pedestrian flow matrix may be defined for a predetermined time range. For example, a first pedestrian flow matrix may be configured for morning, while a second pedestrian flow matrix may be defined for the evening. In some embodiments, multiple pedestrian flow matrices may be generated for the same area over different periods of times, as shown in FIG. 3B discussed below.

Referring now to Block 220 of FIG. 2, the apparatus 10 includes means, such as the processing circuitry 12, the processor 14, or the like, for assigning at least one of the pedestrian trips to one or more of the pedestrian flow compartments. In some embodiments, the assignment may be based on the origin and the destination of the given pedestrian trip. In some embodiments, the apparatus 10 may include means, such as the processing circuitry 12, the processor 14, or the like, for initially distributing a given pedestrian trip to a corresponding pedestrian flow matrix based on the spatiotemporal information relating to the pedestrian trip. For example, a pedestrian trip that includes an origin location, a destination location, and a time range that is within a range of locations and time of a pedestrian flow matrix may be further assigned to a given pedestrian flow compartment within the given pedestrian flow compartment. In some embodiments, a given pedestrian trip may be distributed to a plurality of pedestrian flow matrices (e.g., some pedestrian flow matrices may overlap in location range). In some embodiments, one or more pedestrian trips of the travel data may be outside of the location range of all of the pedestrian flow matrices. For example, the travel data received may include data for a larger area than any of the generated pedestrian flow matrices.

In some embodiments, the travel data may include trip information for trips that are at least partially automated (e.g., vehicle, public transportation, or the like). For example, many people commuting within a city may take multiple transportation methods during a given commute including portions walking and portions riding or otherwise. In some embodiments, the apparatus 10 includes means, such as the processing circuitry 12, the processor 14, or the like, for identifying one or more trips that include at least a portion of non-pedestrian transportation. For example, the identification may be based on the amount of time and distance between the origin and destination (or any sublocation points between the origin and destination). For example, the time between beginning at the origin and reaching the destination may be faster than a person would typical cover the distance walking. In some embodiments, the apparatus 10 includes means, such as the processing circuitry 12, the processor 14, or the like, for modifying travel data that includes non-walking modes of transportation. For example, in an instance there are additional sublocation points between the origin and destination, then the apparatus 10 may, such as by the processing circuitry 12, remove at least a portion of the trip that was completed via a non-walking mode of transportation. In some embodiments, the apparatus 10 includes means, such as the processing circuitry 12, the processor 14, or the like, for removing trip data that includes non-walking modes of transportation (e.g., car or train). In some embodiments, the apparatus 10 may include means for providing one or more of the pedestrian flow matrices to third parties for use. For example, the information may be used by the government to assist with transportation planning.

Referring now to Block 230 of FIG. 2, the apparatus 10 includes means, such as the processing circuitry 12, the processor 14, or the like, for predicting a location of one or more users based on the pedestrian flow matrix. In various embodiments, the apparatus 10 may include means, such as the processing circuitry 12, the processor 14, or the like, for using machine learning to determine the location of one or more users. For example, the processing circuitry 12 may include means for combining one or more pedestrian flow matrices discussed herein to predict the location of one or more users based on both spatial and temporal components. In various embodiments, the apparatus 10 may include means, such as the processing circuitry 12, for using machine learning to update the pedestrian flow matrices discussed herein during operations. In some embodiments, the apparatus 10 may be configured to verify determinations based on a given pedestrian flow matrix and update the matrix accordingly. For example, the apparatus 10 may receive addition travel data during the verification process, which may also be added to the given pedestrian flow matrix for future use. In some embodiments, the apparatus 10 may include means, such as the processing circuitry 12, for using machine learning to enhance and/or maintain data integrity (e.g., by monitoring for data anomalies). For example, the apparatus 10 may use unsupervised machine learning, such as clustering, to enhance and/or maintain data integrity. Additionally or alternatively, the apparatus 10 may include means, such as the processing circuitry 12, for using machine learning to predict future trip information based on historical patterns.

Referring now to Block 240 of FIG. 2, the apparatus 10 includes means, such as the processing circuitry 12, the processor 14, or the like, for determining an advertisement to provide to a user based on the pedestrian flow matrix. For example, advertisements may be sold such that they target a set amount of people. In some embodiments, the advertisement may be visual and/or audible. For example, the advertisement may be a picture (e.g., a picture advertising a certain amount off during a sale). In some embodiments, the advertisement may be a video. In other embodiments, the advertisement may be a combination of still pictures and videos. Additionally, sound may accompany any visual advertisement information. Alternatively, the advertisement may be only audible.

In some embodiments, the travel data may also include at least one characteristic of the one or more pedestrians. In some embodiments, the apparatus 10, such as the processing circuitry 12, the processor 14, or the like, may include means for determining the advertisement information to be provided based on the at least one characteristic, such as gender, age, height, weight, and/or the like. For example, the apparatus 10, such as the processing circuitry 12, the processor 14, or the like, may display one of the advertisements that would typically target a specific gender that frequents a given area.

In some embodiments, the determination of the type of advertisement to be displayed may be made independent of the display location. For example, the determination of the type of advertisement may be decided before the display location is determined (e.g., a brand contracts to have their advertisement on a specific robot regardless of location) or with no regard to the display location (e.g., the type of advertisement displayed may be time based). In other embodiments, the determination of the type of advertisement may be determined based at least in part on the display location. For example, there may be a tiered system that allows those advertising to select the amount of pedestrians or target demographics they want their advertisement to reach (e.g., reaching more people in populated areas may cost more for the companies advertising). In such an example, advertisements may have a designation to only be played in areas having a certain density of pedestrians. For example, some advertisements may be tailored to a certain size and type of crowd. Additionally, there may be similar designations for the demographic characteristics discussed above (e.g., a company may only care about their advertisement being seen by 18-24 year olds).

Referring now briefly to FIGS. 3A and 3B, example pedestrian flow matrices are shown in accordance with the example embodiment. As shown in FIG. 3A, the pedestrian flow matrix may have one or more pedestrian flow compartments (e.g., compartment 300) that are defined as the pedestrian trips with corresponding origin and destination locations. In various embodiments, different pedestrian flow matrices may be different sizes based on the size of compartments (e.g., zip code level, link level, POI level, etc.). In some embodiments, a given pedestrian flow matrix may have a predetermined time range, such that multiple pedestrian flow matrices with the same dimensions and different time ranges may be combined together, as shown in FIG. 3B. For example, there may be four Zip Code Level pedestrian flow matrices with the same dimensions for four different times (e.g., T1-T4). Additionally, in some embodiments, the pedestrian flow matrices may be divisible into smaller pedestrian flow matrices (e.g., Zip Code Level compartment 300 may be divided into the Link Level Matrix shown and the Link Level compartment 310 may be divided into the POI Level shown.

FIG. 2 illustrate a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 16 of an apparatus 10 employing an embodiment of the present invention and executed by a processing circuitry 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of organizing pedestrian movement data, the method comprising:
   receiving a set of travel data, wherein the set of travel data comprises one or more pedestrian trips comprising an origin and a destination;
   generating a pedestrian flow matrix, wherein (i) the pedestrian flow matrix has one or more pedestrian flow compartments, iii) each of the one or more pedestrian flow compartments is uniquely defined by a combination of an origin location and a destination location, (iii) each pedestrian flow compartment is divided based on a first level defined as one of a zip code level, a link level, or a point of interest level and (iv) each pedestrian flow compartment describes one or more characteristics associated with the travel data;

generating an additional pedestrian flow matrix, wherein (i) the additional pedestrian flow matrix has one or more pedestrian flow compartments, (ii) each of the one or more pedestrian flow compartments is uniquely defined by a combination of the origin location and the destination location and (iii) each pedestrian flow compartment is divided based on a second level defined as one of a zip code level, a link level, or a point of interest level, wherein the first level and the second level are different;

based on the origin and the destination of a given pedestrian trip, assigning at least one of the pedestrian trips to one or more of the pedestrian flow compartments of the pedestrian flow matrix and additional pedestrian flow matrix;

predicting a location of a user using a machine learning model, wherein the machine learning model is configured to combine the pedestrian flow matrix and the additional pedestrian flow matrix to predict the location of the user; and causing the transmission of a signal to be provided relating to an advertisement to provide to the user based on the pedestrian flow matrix and the additional pedestrian flow matrix.

2. The method of claim 1, further comprising determining the advertisement to provide to a user based on the pedestrian flow matrix.

3. The method of claim 1, wherein the one or more pedestrian flow compartments are divided based on at least one of zip code level, link level, or point of interest level.

4. The method of claim 1, wherein the one or more pedestrian trips comprises temporal information comprising a time at original and/or a time at destination.

5. The method of claim 4, wherein a plurality of pedestrian flow matrices are each generated with a plurality of time ranges.

6. The method of claim 1, wherein the set of travel data further comprises one or more sub-location points, wherein the sublocation points are intermediate locations between the origin and the destination.

7. The method of claim 6, wherein at least one sublocation point is used as an origin or destination in determining the assignment of the pedestrian tip to the pedestrian flow compartment.

8. An apparatus for organizing pedestrian movement data, the apparatus comprising at least one processor and at least one non-transitory memory including computer program code instructions, the computer program code instructions configured to, when executed, cause the apparatus to:

receive a set of travel data, wherein the set of travel data comprises one or more pedestrian trips comprising an origin and a destination;

generate a pedestrian flow matrix, wherein (i) the pedestrian flow matrix has one or more pedestrian flow compartments, (ii)each of the one or more pedestrian flow compartments is uniquely defined by a combination of an origin location and a destination location, (iii) each pedestrian flow compartment is divided based on a first level defined as one of a zip code level, a link level, or a point of interest level and (iv) each pedestrian flow compartment describes one or more characteristics associated with the travel data;

generate an additional pedestrian flow matrix, wherein (i) the additional pedestrian flow matrix has one or more pedestrian flow compartments, (ii) each of the one or more pedestrian flow compartments is uniquely defined by a combination of the origin location and the destination location and (iii) each pedestrian flow compartment is divided based on a second level defined as one of a zip code level, a link level, or a point of interest level, wherein the first level and the second level are different;

based on the origin and the destination of a given pedestrian trip, assign at least one of the pedestrian trips to one or more of the pedestrian flow compartments of the pedestrian flow matrix and additional pedestrian flow matrix;

predict a location of a user using a machine learning model, wherein the machine learning model is configured to combine the pedestrian flow matrix and the additional pedestrian flow matrix to predict the location of the user; and cause the transmission of a signal to be provided relating to an advertisement to provide to a user based on the pedestrian flow matrix and the additional pedestrian flow matrix.

9. The apparatus of claim 8, wherein the computer program code instructions are further configured to, when executed, cause the apparatus to determine the advertisement to provide to a user based on the pedestrian flow matrix.

10. The apparatus of claim 8, wherein the one or more pedestrian flow compartments are divided based on at least one of zip code level, link level, or point of interest level.

11. The apparatus of claim 8, wherein the one or more pedestrian trips comprises temporal information comprising a time at original and/or a time at destination.

12. The apparatus of claim 11, wherein a plurality of pedestrian flow matrices are each generated with a plurality of time ranges.

13. The apparatus of claim 8, wherein the set of travel data further comprises one or more sub-location points, wherein the sublocation points are intermediate locations between the origin and the destination.

14. The apparatus of claim 13, wherein at least one sublocation point is used as an origin or destination in determining the assignment of the pedestrian tip to the pedestrian flow compartment.

15. A computer program product comprising at least one non-transitory computer-readable storage medium having computer-executable program code portions stored therein, the computer-executable program code portions comprising program code instructions configured to:

receive a set of travel data, wherein the set of travel data comprises one or more pedestrian trips comprising an origin and a destination;

generate a pedestrian flow matrix, wherein (i) pedestrian flow matrix has one or more pedestrian flow compartments, iii) each of the one or more pedestrian flow compartments is uniquely defined by a combination of an origin location and a destination location, (iii) each pedestrian flow compartment is divided based on a first level defined as one of a zip code level, a link level, or a point of interest level and (iv) each pedestrian flow compartment describes one or more characteristics associated with the travel data;

generate an additional pedestrian flow matrix, wherein (i) the additional pedestrian flow matrix has one or more pedestrian flow compartments, (ii) each of the one or more pedestrian flow compartments is uniquely defined by a combination of the origin location and the destination location and (iii) each pedestrian flow compartment is divided based on a second level defined as one of a zip code level, a link level, or a point of interest level, wherein the first level and the second level are different;

based on the origin and the destination of a given pedestrian trip, assign at least one of the pedestrian trips to one or more of the pedestrian flow compartments of the pedestrian flow matrix and additional pedestrian flow matrix;

predict a location of a user using a machine learning model, wherein the machine learning model is configured to combine the pedestrian flow matrix and the additional pedestrian flow matrix to predict the location of the user; and cause the transmission of a signal to be provided relating to an advertisement to provide to a user based on the pedestrian flow matrix and the additional pedestrian flow matrix.

16. The computer program product of claim 15, wherein the program code instructions are further configured to determine the advertisement to provide to a user based on the pedestrian flow matrix.

17. The computer program product of claim 15, wherein the one or more pedestrian flow compartments are divided based on at least one of zip code level, link level, or point of interest level.

18. The computer program product of claim 15, wherein the one or more pedestrian trips comprises temporal information comprising a time at original and/or a time at destination.

19. The computer program product of claim 18, wherein a plurality of pedestrian flow matrices are each generated with a plurality of time ranges.

20. The computer program product of claim 15, wherein the set of travel data further comprises one or more sublocation points, wherein the sublocation points are intermediate locations between the origin and the destination and at least one sublocation point is used as an origin or destination in determining the assignment of the pedestrian tip to the pedestrian flow compartment.

* * * * *

UNITED STATES PATENT AND TRADEMARK OFFICE
CERTIFICATE OF CORRECTION

PATENT NO. : 11,443,341 B2
APPLICATION NO. : 16/692772
DATED : September 13, 2022
INVENTOR(S) : James Fowe et al.

It is certified that error appears in the above-identified patent and that said Letters Patent is hereby corrected as shown below:

In the Claims

In Column 12, Line 62, Claim 1, delete "iii)" and insert -- (ii) --, therefor.

In Column 14, Line 52, Claim 15, delete "(i) pedestrian" and insert -- (i) the pedestrian --, therefor.

In Column 14, Line 54, Claim 15, delete "iii)" and insert -- (ii) --, therefor.

Signed and Sealed this
Twelfth Day of September, 2023

Katherine Kelly Vidal
*Director of the United States Patent and Trademark Office*